May 29, 1962  W. POTTMANN  3,036,484
MACHINE FOR CUTTING OUT SHOULDER PADS FROM BLOCKS
OF FULLY POURED FOAMY MATERIAL
Filed Sept. 9, 1957  3 Sheets-Sheet 1

INVENTOR.
Walter Pottmann
BY Ernest G Montague
Attorney

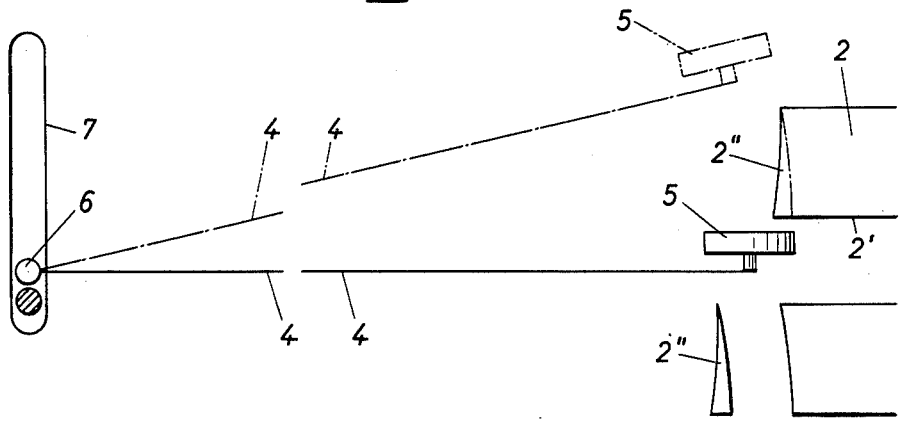
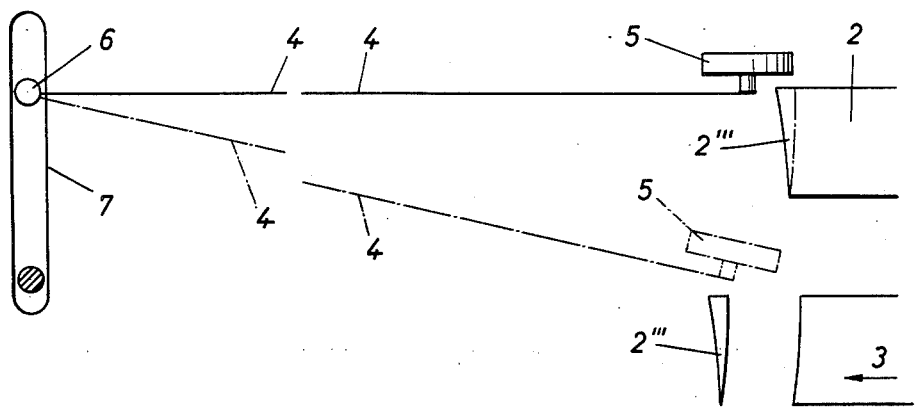

May 29, 1962

W. POTTMANN 3,036,484

MACHINE FOR CUTTING OUT SHOULDER PADS FROM BLOCKS
OF FULLY POURED FOAMY MATERIAL

Filed Sept. 9, 1957

INVENTOR.
Walter Pottmann
BY
Attorney

United States Patent Office 3,036,484
Patented May 29, 1962

3,036,484
MACHINE FOR CUTTING OUT SHOULDER PADS FROM BLOCKS OF FULLY POURED FOAMY MATERIAL
Walter Pottmann, 10 Strohgasse, Linz (Rhine), Germany
Filed Sept. 9, 1957, Ser. No. 682,877
Claims priority, application Germany Dec. 7, 1956
5 Claims. (Cl. 83—248)

The present invention relates to a machine for cutting out shoulder pads from blocks of fully poured foamy material.

Machines are known already which permit the cutting of form parts from a block of material and particularly from the end face of such block of material which is advanced stepwise.

It is one object of the present invention to advance these known machines to permit cutting of form parts from a block of material, which form parts have crosswise disposed surface curves and which are of wedge shape. Furthermore, the machine in accordance with the present invention is to operate without any waste stroke and the cutting of the form parts is to be performed without any waste of material.

It is, therefore, another object of the present invention to provide a machine for cutting out shoulder pads from blocks of fully poured foamy material by providing a double edged cutting tool which is curved complementary to the curvature of one of the curves of the faces of the form part and which cutting tool rocks after each cutting stroke in relation to the block of material which is advanced after each second cutting stroke. The cutting tool is mounted on the free end of a swinging arm, the length of which corresponds with the radius of the curvature of the second curve on the face of the form piece.

Due to the double edged cutting tool, it is possible to bring about a cutting step with each movement of said cutting tool in either direction. Due to the curvature of the cutting tool corresponding with the curve on the face of the form piece to be cut, a curvature on the form piece is brought about automatically during the cutting step. Due to the fact that the cutting tool is disposed at the end of a swinging arm of predetermined length, it is possible that the working tool moves through the block of material along a curved path which is perpendicular to the curvature of the cutting tool. By providing the rocking movement of the cutting tool relative to the block of material, the wedge shape of the form piece is brought about and it is simultaneously achieved that a wasteless cutting is possible.

It is still another object of the present invention to provide a machine for cutting out shoulder pads from blocks of fully poured foamy material wherein the rocking movement of the cutting tool is advantageously achieved by moving the pivotal point of the swinging arm crosswise to the cutting stroke. The cutting path is not changed by the displacement of the pivot point of the swinging arm, since the active length of the swinging arm remains constant. The cutting path is merely moved relative to the block of material. In this manner it is achieved that alternately always a form piece is cut which has its pointed end at its bottom, while the next form piece has its base of the wedge shaped form piece at the bottom. In spite of the wedge shape of the form piece, the cut starts always on the base of the form piece and not on the thin and pointed end of the form piece.

The displacement of the pivot point of the swinging arm is brought about in accordance with the present invention in a simple manner by mounting the pivot for the swinging arm in a guide and subjecting the pivot to a cam operated connecting rod, the effective length of which is adjustable.

It is yet another object of the present invention to provide a machine for cutting out shoulder pads from blocks of fully poured foamy material by increasing the output of the machine in an advantageous manner by the arrangement of two cutting tool rows in which the tools are spaced alternately in one row just between the tools in the other row, and the cutting tools of the front row are disposed between guide cheeks, the distance of which is smaller than the width of the form pieces to be cut.

The output of the machine is increased in such a manner as a single drive is necessary only for a plurality of swing arms, each of which carries a double edged cutting tool. In addition, the small form pieces may be cut out from wide blocks of material. It is in this case not necessary to cut the block of material to the narrow width of the form pieces.

The provision of guide cheeks, which is an advantage in this embodiment, may be brought about in a simple and safe manner by providing the lateral cheeks on the bottom of the guide channel, the front face of which bottom has cut-outs alternately of different depths corresponding with the distance between the rows of the cutting tools and the cut-outs are equipped with guide cheeks mounted on the bottom of the channel.

With these and other objects in view which will become apparent in the following detailed description, the present invention will be clearly understood in connection with the accompanying drawings, in which:

FIG. 3 is a schematic view indicating the lowermost position of the swinging arm;

FIG. 4 is a schematic view showing the uppermost position of the swinging arm.

Figure 1:
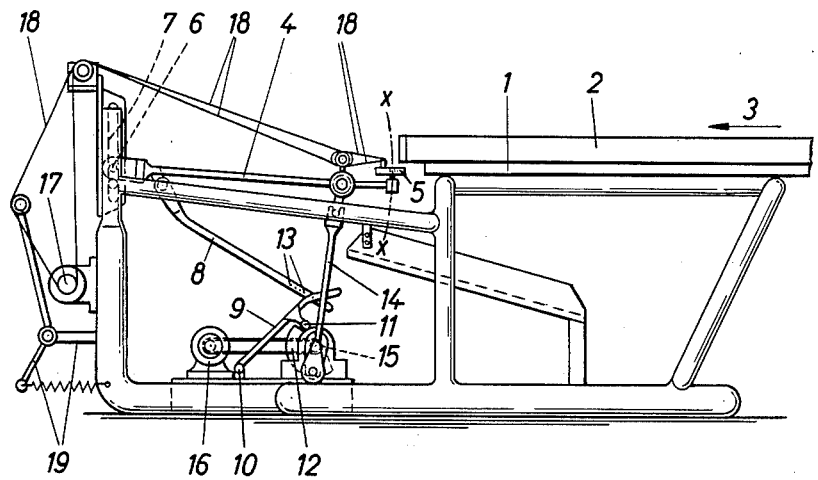
FIGURE 1 is a front elevation of the machine.
Figure 2:
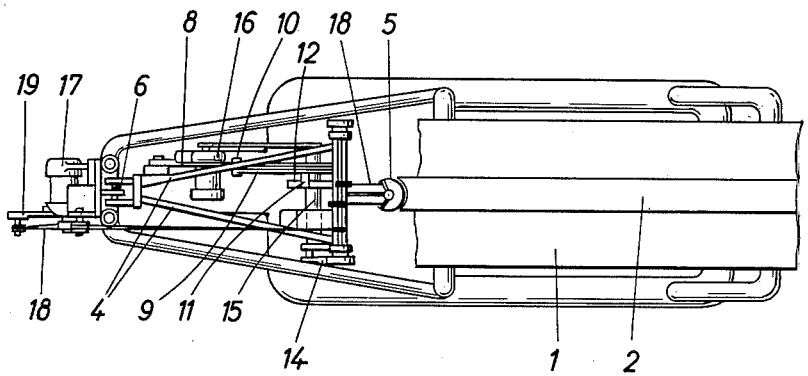
FIG. 2 is a top plan view thereof.

Referring now to the drawings, the machine comprises a table 1 on which the material 2 is advanced in the direction of the arrow 3 stepwise within a cycle of operation. A swinging arm 4 is disposed in front of the table 1, which swinging arm 4 is formed as a one-armed lever and which carries at its free end the cutting tool or cutting tools 5. The other end of the arm 4 is pivoted to a bearing 6. The arm 4 thus swings along the curved line x—x (FIG. 1), which line is disposed perpendicularly to the plane along which the material advances. The bearing 6 is movably mounted in the guide 7.

Any displacement of the bearing 6 in the guide 7 is brought about by a connecting rod 8 which engages the swinging arm 4 adjacent the bearing 6 and which is pivotally connected with an arm 9. The latter is turnably mounted in the immovable pivot 10 and carries a roller 11 which engages a cam 12. For the pivotal connection between the connecting rod 8 and the arm 9 pivot eyes 13 are provided in series in the connecting rod 8, so that the effective length of the connecting rod 8 may be changed. The up and down movement of the swinging arm 4 is achieved by means of the connecting rod 14, which engages the swinging arm 4 adjacent its free end.

The connecting rod 14 as well as the arm 9 are operated from the same shaft 15 which is driven by the motor 16.

The cutting movement of the knife or cutting tool is brought about by a particular motor 17, the driving shaft of which is coupled with the knife shaft by a pull drive 18. A tensioning device 18' serves the purpose to maintain the pull drive 18 always in stressed position.

The machine designed in accordance with the present invention operates in the following manner:

Starting with the position of the swinging arm 4 disclosed in FIG. 3, the bearing 6 is found in its lowermost position. This position is approximately at the height of the lower edge 2' of the material 2 fed to the machine. Now, the swinging arm 4 swings upwardly by means of the connecting rod 14 and cuts thereby with its knife 5 a shoulder pad 2". This shoulder pad 2" has a conical cross section and is also curved due to the use of rounded knives. Its apex is disposed in upward direction in FIG. 3 of the drawings. When the swinging arm has reached its position shown in point dotted lines in FIG. 3 of the drawings, the bearing 6 is moved upwardly by means of the connecting rod 8, so that it assumes the position shown in FIG. 4. Then, by operation of the connecting rod 14 the swinging arm 4 performs a downward swinging movement and, thereby, a cutting operation by the knife 5, without necessitating prior thereto a further feeding step. By this downward swinging of the swinging arm 4 a further shoulder pad 2''' is cut off which has likewise a conical cross section, however, the apex of which is in FIG. 4 of the drawings at the bottom and which shoulder pad 2' is also curved.

Now the material is advanced and in particular for the thickness of a shoulder pad at its thickest point. Simultaneously, the bearing 6 is returned to the lowermost position, so that the swinging arm is moved from the position shown in point dotted lines in FIG. 4 into the position shown in full lines in FIG. 3.

Figure 5:
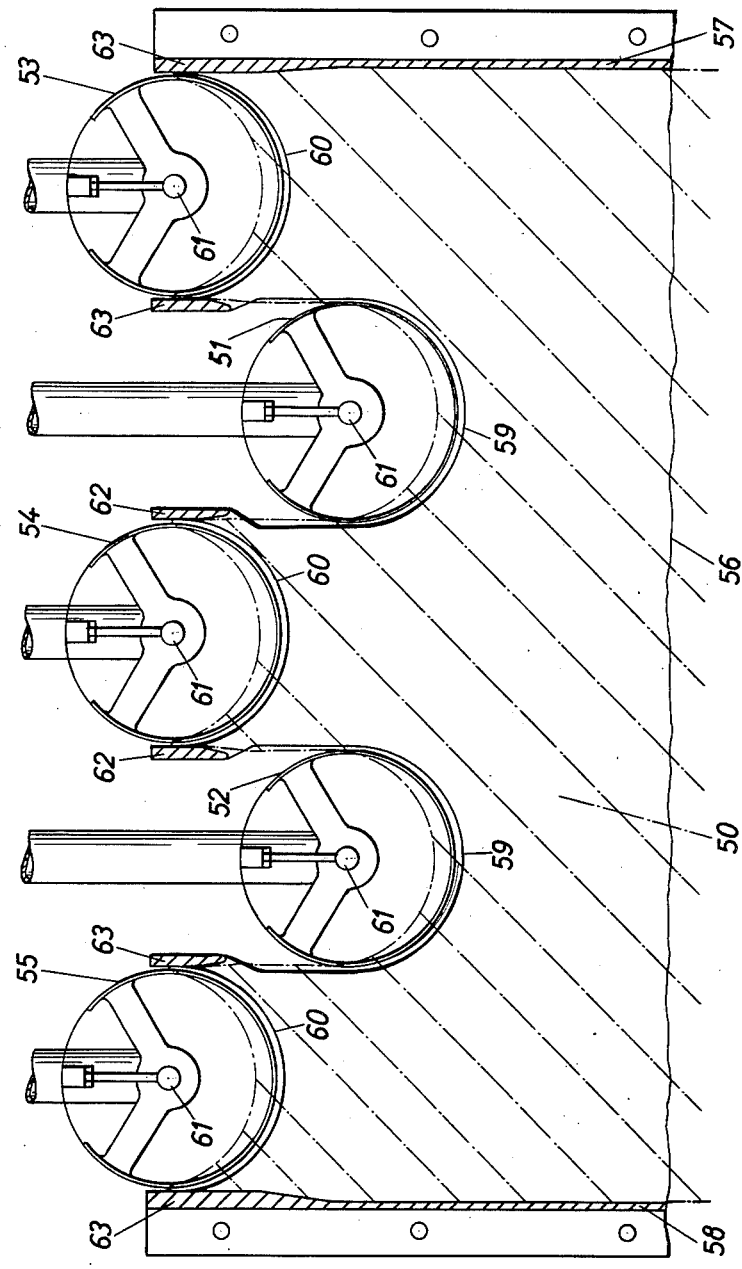
FIG. 5 is a top plan view of the series arrangement of the knives in connection with a block of a greater width than that of a shoulder pad.

Referring now to the embodiment shown in FIG. 5, the block 50 of foamy material which has a width equal to the plurality of each shoulder pad to be cut out is fed to the cutting tool 51, 52, 53, 54, and 55 through a channel.

The channel has the bottom 56 and the lateral cheeks 57 and 58, so that the block 50 of foamy material is fed between these lateral cheeks while supported on its bottom 56 and in particular following the cycle of the machine.

The knives 53, 54 and 55 form one row and likewise the knives 51 and 52 form another row. The latter knives 51 and 52 form a gap in relation to the position of the knives 53, 54 and 55. Correspondingly, the front face of the block 50 has cut-outs 59 and 60, respectively, of different depths, through which the knives 51 to 55 may project and in particular during the cutting movement through the block.

In the embodiment disclosed in FIG. 5 oscillating knives are shown which perform an oscillating movement upon the axes 61.

The forward and thus less deep cut-outs 60 are laterally limited by the cheeks 62 and 63, respectively. The cheeks 62 as well as the cheeks 63 form a cooperating pair. The distance between the cheeks 62 and the cheeks 63, respectively, is smaller than the width of a shoulder pad. By this arrangement the foamy material fed to the knives 53, 54 and 55 is pressed together at that point, so that a holding of the projecting sections of foamy material is obtained and, thereby, a clean cut is brought about.

The rows of knives 51 to 52 may be secured in this machine to a cross beam connected to the swinging arm, the pivotal point of which is displaceable and which may, therefore, perform a swinging movement relative to the block of foamy material or a channel may be provided in which the block of foamy material is fed and which channel performs a swinginng movement relative to the cutting tools, in order to cut out the shoulder pads successively in known manner without waste.

While I have disclosed several embodiments of the present invention, it is to be understood that these embodiments are given by example only and not in a limiting sense, the scope of the present invention being determined by the objects and the claims.

I claim:

1. A machine for cutting out shoulder pads in a concavely shaped arc from a block of foamy material, comprising a frame, a table mounted on said frame, a block supported by said table and adapted to be advanced intermittently for a length equal with the greatest thickness of said shoulder pads, a pivot disposed opposite said block, a single swinging arm mounted upon said pivot in front of said table, solely said swinging arm swinging in a plane disposed perpendicularly to said pivot, the swinging stroke of said swinging arm being greater than the thickness of said block, a guide disposed perpendicularly to said pivot, means for displacing said pivot of said swinging arm along said guide upon termination of each stroke and in time intervals corresponding with the cycle of said intermittent feeding of said block, the extent of said displacement being complemetary to the thickness of said block, a double edged cutting tool secured to the free end of said swinging arm and forming a cutting tool face disposed perpendicular with respect to a plane defined by said pivot and said swinging arm, said curved tool face having curved cutting edges, said cutting edges being complementary to one of the curvatures of said shoulder pads and freely projecting beyond the free end of said swinging arm, and said cutting tool cutting off one of said shoulder pads from said block during each stroke of said swinging arm.

2. The machine, as set forth in claim 1, wherein a plurality of said cutting tools is arranged in a plurality of parallel rows disposed behind each other, said cutting tools of each of said rows are spaced apart a predetermined distance and said cutting tools of the following row are disposed adjacent said spaces, guide cheeks disposed in the most forward of said rows spaced apart from each other at a distance lesser than the width of said shoulder pads and in lateral engagement with said cutting tools, in order to press together projections of said blocks of foamy material fed to said cutting knives of the forwardmost of said rows.

3. The machine, as set forth in claim 1, wherein said means for displacing said pivot comprises a connecting rod, one end of the latter engaging said swinging arm intermediate its ends, a cam disk rotatably mounted, means associated with the other end of said connecting rod including follower means engaging said cam disk in order to cause a substantially reciprocating movement of said one end of said connecting rod, and means for adjusting the effective length of said connecting rod.

4. The machine, as set forth in claim 3, wherein said connecting rod has a plurality of pivot eyes disposed along one end of said connecting rod, said pivot eyes constituting said means for adjusting the effective length of said connecting rod, and said means associated with said connecting rod comprises an arm, one end of said arm being pivotally secured to any one of said pivot eyes of said connecting rod, the other end of said arm being pivotally secured to said frame, and said follower means comprises a roller engaging said cam disk and secured to said arm intermediate its ends.

5. The machine, as set forth in claim 2, wherein each pair of said guide cheeks define a guide channel, and the front face of said block of foamy material has cut-outs alternately of different depths corresponding with the distance between the said parallel rows of said cutting tools from said front face, and said cutting tools of said respective rows are received in said cut-outs at the bottom of said channels.

References Cited in the file of this patent

UNITED STATES PATENTS

| | | |
|---|---|---|
| 896,924 | Lieb | Aug. 25, 1908 |
| 1,333,940 | Seymour | Mar. 16, 1920 |
| 1,669,623 | Messer | May 15, 1928 |
| 2,151,438 | Pierce | Mar. 21, 1939 |
| 2,335,515 | Jehle | Nov. 30, 1943 |
| 2,365,288 | Pask | Dec. 19, 1944 |
| 2,365,663 | Torrese | Dec. 26, 1944 |
| 2,613,740 | Drain | Oct. 14, 1952 |
| 2,855,043 | Opferkuch | Oct. 7, 1958 |

FOREIGN PATENTS

| | | |
|---|---|---|
| 713,862 | Great Britain | Aug. 18, 1954 |